United States Patent [19]

Tsakiroglou

[11] Patent Number: 4,819,594
[45] Date of Patent: Apr. 11, 1989

[54] REVERSIBLE ROTARY INTERNAL COMBUSTION ENGINE

[76] Inventor: George B. Tsakiroglou, No. 25 Porchester Pl., Flat 95, London, Great Britain, W2 2PE

[21] Appl. No.: 144,740

[22] Filed: Jan. 19, 1988

Related U.S. Application Data

[63] Continuation-in-part of Ser. No. 786,400, Oct. 7, 1985, abandoned.

[30] Foreign Application Priority Data

Feb. 6, 1984 [GB] United Kingdom ................ 8403062
Jul. 12, 1984 [GB] United Kingdom ................ 8417766

[51] Int. Cl.$^4$ ............................................. F02B 53/06
[52] U.S. Cl. .................................... 123/201; 123/230; 418/223; 418/239; 418/249
[58] Field of Search ........................ 123/201, 228, 230; 418/223, 239, 249

[56] References Cited

U.S. PATENT DOCUMENTS

| | | | |
|---|---|---|---|
| 915,236 | 3/1909 | Snodgrass | 418/223 |
| 952,465 | 3/1910 | Nygaard | 418/249 X |
| 1,013,885 | 1/1912 | McConnell | 123/201 |
| 1,165,988 | 12/1915 | Mitchell | 123/201 |
| 1,379,028 | 5/1921 | Horspool | 123/201 |
| 1,738,320 | 12/1929 | Rothenberger | 123/201 |
| 1,799,527 | 4/1931 | Plato | 123/230 |
| 1,849,220 | 3/1932 | Boessenecker . | |
| 1,949,225 | 2/1934 | Van Lammeren . | |
| 2,371,514 | 3/1945 | Gold . | |
| 2,997,848 | 8/1961 | Snyder . | |

FOREIGN PATENT DOCUMENTS

| | | |
|---|---|---|
| 151436 | 6/1902 | Fed. Rep. of Germany . |
| 719397 | 4/1942 | Fed. Rep. of Germany ...... 123/230 |
| 1366084 | 7/1964 | France . |

Primary Examiner—Michael Koczo
Attorney, Agent, or Firm—Wenderoth, Lind & Ponack

[57] ABSTRACT

A reversible rotary internal combustion engine comprising a stator which defines a cylindrical chamber (43), a drive shaft (1) extending coaxially through the chamber, a rotor (2) comprising a cylindrical hub mounted coaxially on the drive shaft and a rotor arm (3) extending radially from the hub, two radially movable wall members (4a, 4b) mounted in the stator, each of the wall members having a retracted position in which the radially inner face of the wall member lies flush with the inner periphery of the stator and an inserted position in which the face of the wall member is in contact with the peripheral surface of the hub, means (8a, 8b) for selecting one of the wall members (4a, 4b) to lie normally in the inserted position so as to divide the chamber (43) into a combustion chamber (47) between such wall member and the rotor arm (3) and an air compression chamber (48), means (12, 13) for introducing air and a fuel into the combustion chamber (47) whereby upon ignition of the fuel/air mixture the combustion gases exert a force on the rotor arm (3) to rotate the rotor (2) in a predetermined direction according to which wall member (4a, 4b) is selected, and timing means sychronized with the rotation of the rotor (2) to retract the selected normally inserted wall member (4a, 4b) for a period of time sufficient to allow the rotating rotor arm (3) to move the space occupied by the selected wall member when inserted and then to reinsert such wall member.

10 Claims, 16 Drawing Sheets

FIG. 11

ENGINE CYCLE OF OPERATION

| ENGINE ANGLE (DEGREES) | | CYCLE PROCESS |
|---|---|---|
| CLOCKWISE | ANTI-CLOCKWISE | |
| 0 | 320 | Fuel ignition occurs and combustion takes place |
| 15 TO 20 | 305 TO 300 | Fuel injection ends. |
| 290 | 30 | The exhaust valve is activated open and the operational radial sealing wall is activated to its fully retracted position, and the exhaust and scavenging process begins. |
| 310 TO 340 | 10 TO 340 | The engine timing may be suitably adjusted so that at any point during this interval the exhaust valve is activated closed and the exhaust ends. In practice, the exhaust should end about 10 degrees before all the scavenge air has left the rotor space. |
| 350 | 330 | The operational radial sealing wall is activated to the position where its circumferential face is adjacent to the cylindrical rotor surface and the charge air inlet timing valve is activated open, and air pressure charging of the combustion chamber begins. |
| 355 TO 359 | 325 TO 321 | The engine timing may be suitably adjusted so that at any point during this interval the charge air inlet timing valve is activated closed and the fuel injection begins. |
| 360 | 320 | Fuel ignition occurs and combustion takes place |

REVERSIBLE ROTARY INTERNAL COMBUSTION ENGINE

This application is a continuation-in-part of now abandoned application Ser. No. 786,400 filed Oct. 7, 1985.

BACKGROUND OF THE INVENTION

The present invention relates to an engine.

Reciprocating internal combustion engines are susceptible to a number of problems. In particular, their reciprocation which in turn is converted into rotation causes wear and vibration problems. Their design necessitates the use of a crankshaft, and in slow-speed reciprocating piston engines developing high powers the use of crossheads, piston rods and connecting rods, which result in a bulky engine and may give rise to problems. They operate best on high quality expensive fuels and are inherently ill adapted to using a variety of fuels. Their geometrical design dictates a cycle of operation whereby, in the two-stroke reciprocating piston engine, exhaust of the combustion gasses expanding in the working cylinder takes place well before their crankshaft completes one half of a revolution, i.e. less than half of the cycle duration, and by doing so the combustion gasses leave the cylinder before they have been given a sufficient time to convert a large portion of their heat energy into useful mechanical work by sweeping as much volume as possible during the power stroke, thus resulting in a high percentage of exhaust gas losses and a relatively low engine efficiency. In addition, the conventional reciprocating internal combustion engines occupy a large amount of space, especially in a vertical direction.

SUMMARY OF THE INVENTION

The engine of the invention is envisaged as an improvement on such conventional engines and is designed as a reversible rotary internal combustion engine.

The engine comprises a stator which defines a cylindrical chamber, a drive shaft extending coaxially through said chamber, a rotor comprising a cylindrical hub mounted coaxially on said drive shaft and a rotor arm extending radially from said hub. The engine also comprises two radially movable wall members referred to as the reciprocating radial sealing walls each assuming a retracted position at which the radially inner face of the wall member lies flush with the inner periphery of the stator and an inserted position at which the said face of the wall member is in contact with the peripheral surface of the hub, means for selecting one of the wall members to lie normally in the inserted position so as to provide said cylindrical stator chamber into a combustion chamber between the wall member and the rotor arm and an air compression chamber.

The engine is provided with means for introducing air and fuel into the combustion chamber whereby upon ignition of the fuel/air mixture the combustion gasses exert a force on the rotor arm to rotate the rotor in a predetermined direction according to which wall member is selected, and timing means synchronized with the rotation of the rotor to retract the selected normally inserted wall member for a period that is sufficient to allow the rotating rotor arm to move through the space occupied by said selected wall member when inserted and then to allow such wall member to be reinserted.

With the above arrangement the engine of the invention has been designed with the aim of achieving the following basic objects:

Its geometry and one revolution cycle of operation is such that in theory the combustion gasses expanding in the rotor space may be allowed to expand throughout 294 degrees of rotation, i.e. in excess of 80% of the cycle duration and thus, allowing a very large portion of heat energy generated thereby to be converted into useful mechanical work by driving the rotor around its casing hence, resulting in a high engine efficiency. This follows from the fact that the longer the combustion gasses are allowed to expand in the working chamber of the engine sweeping volume and resulting in the high conversion of heat energy generated thereby into useful mechanical work, the higher the engine efficiency.

Furthermore, the gas expansion occurs simultaneously with the air compression process within the same rotor space and thus, the engine operates on the one-stroke principle. The engine is reversible and thus it can operate in either the clockwise or the counter-clockwise direction of rotation, and the rotation may easily be reversed by means of suitable components fitted onto the engine.

These components are referred to as the reciprocating radial sealing walls and are fitted to the stator casing at predetermined positions as dictated by the engine cycle of operation. The engine has the capability of achieving high compression ratios and thus benefits from the advantage of operating on a variety of fuels and in particular fuels of low quality such as H.V.F. (high voscosity fuels) and slurries e.g. of coal.

The rotor which carries the rotary piston rotates concentrically with its driveshaft around the stator casing thus, avoiding the use of eccentric gears. The number of moving parts is relatively small resulting in easy maintenance and good reliability. The engine occupies substantially less space than a conventional internal combustion reciprocating piston engine and is designed to operate mainly in the low to medium speed range finding its application in ships, power stations, oil fields and industry, operating as a main power/propulsion unit or a generator prime mover. However, it may be adapted to operate at higher speeds thus also finding application in the car and aircraft industry.

Hence, in order to achieve the abovementioned objects the engine is designed as a "rotary internal combustion reversible one-revolution engine" having a stator casing with opposed spaced sidewalls and an intervening, enclosing transverse cylindrical wall referred to as the peripheral part of the stator casing, defining together therein a cylindrical housing chamber, and a motor mounted in the cylindrical housing chamber of the casing. The rotor has a key hole cross-sectional shape and is coaxially mounted upon a driveshaft which is rotatably supported on suitable bearings placed externally and on either side of the opposed sidewalls of the stator casing and mounted on the engine supporting structure, the driveshaft extending coaxially through the cylindrical housing chamber of the stator casing.

The driveshaft is also rotatably sealed by suitable gaskets which are situated coaxially around the cylindrical shaft opening of each of the aforementioned opposed sidewalls, and extends through the cylindrical housing chamber of the stator from one sidewall through to the other, one end of the shaft carrying the engine flywheel while the other end being attached to the drive unit. The rotor may rotate in either the clockwise or the counter-clockwise direction of rotation around the stator casing, and its axis coincides with that of the driveshaft which passes through the center of the cylindrical chamber of the stator housing.

The rotor comprises a cylindrical hub mounted coaxially on said driveshaft and a rotor radial arm extending from said hub outwards of the rotor center towards the inner circumference of the stator casing, said radial arm referred to as the rotary piston. The lateral faces of the rotary piston may span a certain width, say over a 40 degree angle. However, this may be chosen accordingly to accomodate different design and operational features of the engine.

The radially outer end face of the rotary piston has a recess for accommodating any movement of the inlet means which may otherwise hinder the rotation of the rotor, and is at all times in contact with the peripheral cylindrical inner surface of the stator casing which is equipped at the position as dictated by the engine cycle of operation with the following components:

Two identical reciprocating radial sealing walls, one operational during the clockwise rotation and the other during the counter-clockwise rotation of the rotor respectively. Both such radial sealing walls are positioned radially with their axes set a fourty degrees to each other forming a fourty degree "vee". Each radial sealing wall is mounted in a cylinder and is spring or pressure biased outwards of the rotor center at the retracted position where its radially inner face lies flush with the inner periphery of the stator casing.

The top of each cylinder which houses a radial sealing wall may be supplied with pressurized hydraulic fluid via a duct which through a two way rotary control valve communicates with a hydraulic cylinder housing a piston which may be activated from its bottom dead center position to its top dead center position and vice-versa, by the engine camshaft at the exact position of the rotor as dictated by the engine cycle of operation.

Hence, when the camshaft activates the said pistons to their top dead centre position, pressurized hydraulic fluid may enter the top of the cylinder which houses the operational radial sealing wall and activate the sealing wall inwards towards the rotor center against the action of its spring, to the inserted position where its radially inner face is in contact with the peripheral surface of the rotor hub.

The two way rotary control valves mentioned above control the admission of hydraulic fluid to the cylinders which house the radial sealing walls. When one of the above valves is set at its open position, it allows compressed hydraulic fluid to flow from the hydraulic cylinder to the top of the cylinder which houses the operational radial sealing wall to activate it. When the valve is set at its closed position, it blocks the inlet of hydraulic fluid to the cylinder which houses the radial sealing wall and opens a return passage connected to the hydraulic fluid sump hence, rendering the radial sealing wall inactive and retracted to the position where its radially inner face lies flush with the peripheral inner surface of the stator casing.

Hence, when the rotor is to rotate in the counter-clockwise direction, the rotary control valve corresponding to the cylinder which houses the radial sealing wall which is operational during the counter-clockwise rotation of the rotor is set at its open position. Accordingly, the rotary control valve corresponding to the cylinder which houses the radial sealing wall which is operational during the clockwise rotation of the rotor is set at its closed position, and vice-versa in the case of the clockwise rotation of the rotor. Midway between the two radial sealing walls, the peripheral wall member of the stator casing is equipped with a charge air inlet timing valve which is disposed in the peripheral wall of the stator in the sector which lies between the planes of the two radial sealing walls and controls the timing and duration of the admission of the compressed charge air supply to the combustion chamber.

The charge air inlet timing valve communicates with the air outlet of the air receiver by means of suitable piping, and is open at its mouth to the rotor space. This valve is hydraulically activated by the camshaft to open or close similar to the radial sealing walls. Next, to the charge air inlet timing valve, one or more fuel injectors are disposed in the peripheral wall member of the stator in the sector which lies between the planes of the two radial sealing walls and which inject a given fuel charge in the combustion chamber of the engine just before the time of ignition, depending on the ignition delay.

Diametrically opposite to the above mentioned sector is an exhaust gas timing valve that is disposed in the peripheral wall of the stator casing of relieving the rotor space from the combustion gasses at the end of the stroke, said valve opening at its mouth to the rotor space and being hydraulically activated to open or close similar to the above mentioned air timing valve and radial sealing walls.

If the engine is designed to rotate at high speeds, the above mentioned radial sealing walls, air inlet and exhaust gas timing valves may be alternatively activated mechanically instead of hydraulically by overhead camshafts, or by a suitable cam/rocker arrangement which may be chain or gear driven by the engine driveshaft. In addition to the above components, the peripheral wall member of the stator casing is fitted with two air outlet ports, each set with its axis about 15 degrees distant from the axis of its closest/adjacent radial sealing wall. However, this distance is not restrictive.

Each air outlet port, one operational during the clockwise rotation and the other during the counter-clockwise rotation, opens at its mouth to the rotor space and communicates with the air inlet of the air receiver via suitable piping which is fitted with a rotary control valve which is set at an open or closed position according to the rotational direction of the rotor, and a one way non-return air outlet valve which permits air to flow only from the rotor space to the air receiver.

Between each such air outlet port and its closest radial sealing wall, the peripheral wall member of the stator casing is fitted with an atmospheric air induction port which allow communication between the rotor space and the atmosphere. This port is equipped with a one way non-return air inlet valve which permits air to flow only from the atmosphere into the rotor space at about the end of the scavenging process, and with a rotary control valve which is set at an open or closed position according to the rotational direction of the rotor. The atmospheric air induction ports open at their to the rotor space while their ends are fitted with an air filter.

Hence, when one of the radial sealing walls is activated inwards towards the rotor center at the inserted position where its radially inner face is in contact with the peripheral surface of the rotor hub, two chambers are defined between the activated radial sealing wall and the rotary piston.

The combustion chamber, comprises a space with boundaries defined by the radial reaction face of the rotary piston, the part of the cylindrical surface of the rotor hub and the arc formed by the inner peripheral surface of the stator casing which lies between the radial reaction face of the rotary piston and the forward radial face of the activated radial sealing wall, the forward radial face of the activated radial sealing wall, and is enclosed by the opposed sidewalls of the stator casing, and the air compression chamber which comprises a space with boundaries defined by the radial leading face of the rotary piston, the radial back face of the activated radial sealing wall, the part of the cylindrical surface of the rotor hub and the arc formed by the inner peripheral surface of the stator casing which lies between the leading radial face of the rotary piston and the radial back face of the activated radial sealing wall, and is enclosed by the opposed sidewalls of the stator casing.

The engine is provided with means for intermittently supplying fuel and air under suitable pressure to the combustion O chamber at the respective positions of the rotor as dictated by the engine cycle of operation, the arrangement being such that when the injected fuel with the charge air is ignited in the combustion chamber, combustion will occur.

If the engine is designed to operate on a low compression ratio, the fuel/air mixture introduced in the combustion chamber may be ignited by one or more spark plugs which may be fitted to the peripheral wall member of the stator casing next to the fuel injectors, and may be fed intermittently with an electrical charge at the point in the cycle when the rotor reaches the firing position. The two respective firing positions of the rotor for the clockwise rotation and counter-clockwise rotation are as follows:

For the anti-clockwise rotation ignition is timed to occur at the instant when the center of the radially outer end face of the rotary piston coincides with the center of the radially inner face of the radial sealing wall which is operational during the clockwise rotation of the rotor. For the clockwise rotation, ignition is timed to occur at the instant when the center of the radially outer end face of the rotary piston coincides with the center of the radially inner face of the radial sealing wall which is operational during the counter-clockwise rotation of the rotor.

Since the two abovementioned firing positions of the rotor are 40 degrees apart, in order to reverse the rotation from counter-clockwise to clockwise, the camshaft is rotated by 40 degrees in the clockwise direction, and vice-versa for the reversal from clockwise rotation to counter-clockwise rotation. The reversing rotation of the camshaft is achieved by the incorporation of a conventional reversing flap mechanism operating within the drive gear of the camshaft.

The engine of the invention may be provided with two or more identical rotors mounted on the same driveshaft for rotation in identical stator housings and having identical cycles of operation with any chosen phase difference between them. To help in the understanding of the invention, the above described engine will now be explained in detail by way of example with reference to the accompanying drawings in which:

BRIEF DESCRIPTION OF THE DRAWINGS

FIG. 11 is a table of the working cycle of the engine for both directions of rotation of the rotor.

DETAILED DESCRIPTION OF THE PREFERRED EMBODIMENT

Figure 1:
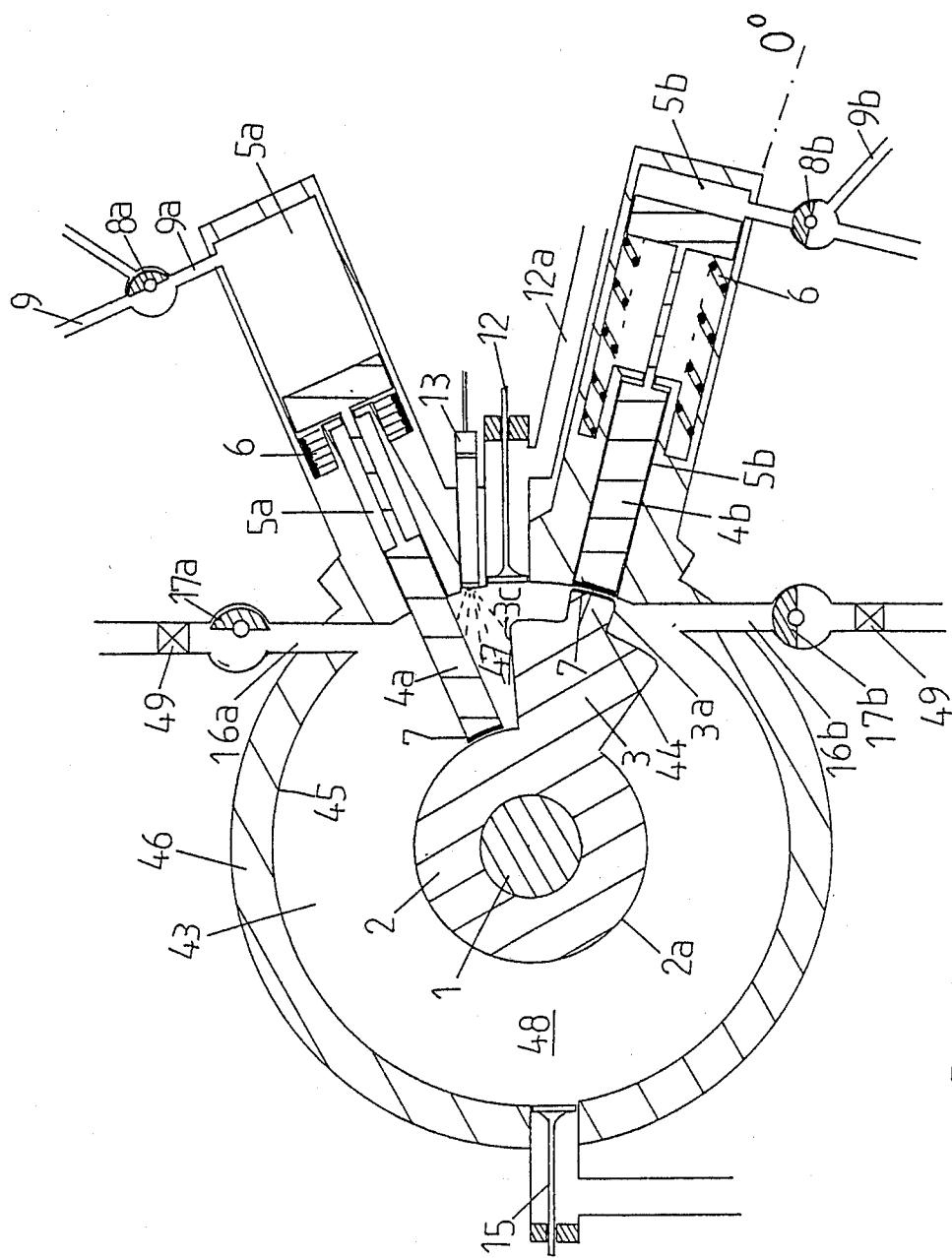
FIG. 1 is a cross-sectional view of the rotor of the engine according to the invention taken along a vertical plane which passes through its center.

Referring first to FIG. 1, the engine comprises a rotor 2 mounted for rotation within the rotor space 43 of the housing and secured to the driveshaft 1. The rotor comprises a cylindrical hub which extends to a rotary piston 3 having a radially outer end face 44 which is recessed in order to accomodate any movement of the inlet means which would otherwise hinder the rotation of the rotor. The face 44 is also fitted with suitable seals 7 and is at all times in contact with the inner periphery 45 of the peripheral wall member 46 of the stator casing.

The peripheral wall 46 is fitted with two reciprocating radial sealing walls 4a and 4b which are mounted in cylinders 5a and 5b respectively, and are spring biased outwards of the rotor center by the springs 6. The radially inner face of each radial sealing wall is also fitted with similar seals 7.

Each cylinder 5 may be supplied with pressurized hydraulic fluid via an inlet duct 9 which through a two way rotary control valve 8 communicates with a hydraulic cylinder containing the hydraulic fluid and housing a piston which is movable from a bottom dead center position to a top dead center position, and vice-versa, by the engine camshaft.

For clockwise rotation, valve 8a operatively associated with cylinder 5a is set and remains at its open position, while valve 8b operatively associated with cylinder 5b is set and remains at its closed position, and vice-versa for counter-clockwise rotation.

Hence, about ten degrees before the rotor reaches the riring position, when the top edge of the radial leading face 3a of the rotary piston coincides with 350 degrees of the scale marked around the casing, which is equivalent to 10 degrees before top dead center in a reciprocating piston engine, the camshaft activates the pistons in the above-mentioned hydraulic cylinders, which correspond to the cylinders which house the radial sealing walls, to their top dead center positions and pressurized hydraulic fluid flows from the said hydraulic cylinders to the valves 8a and 8b. Since during the clockwise rotation valve 8b is set and remains at its closed position, the hydraulic fluid supplied to it returns to its sump via return line 9b.

Furthermore, since valve 8a is set and remains at its open position, the hydraulic fluid supplied to it may enter cylinder 5a via inlet duct 9a and activate the radial sealing wall 4a inwards towards the rotor center of an inserted position where its radially inner face is in contact with the peripheral surface 2a of the rotor hub. Thus, with this arrangement two chambers are defined within the rotor space 43 between the rotary piston 3 and the activated radial sealing wall 4a, the combustion chamber 47 and the air compression chamber 48.

The two radial sealing walls 4a, 4b are disposed radially with their axes set at 40 degrees to each other, and between them the peripheral wall 46 is fitted with a charge air inlet timing valve 12 and one or more fuel injectors 13 both in the sector which lies between the planes of the two radial sealing walls. Diametrically opposite said sector the peripheral wall 46 is fitted with an exhaust gas timing valve 15. All the abovementioned valves open at their mouth to the rotor space 43 and are hydraulically activated to their respective open or closed positions by the engine camshaft in conjunction with the abovementioned hydraulic cylinder/piston arrangement. The wall 46 is also fitted with two air outlet ports 16a, 16b which are disposed opposite each other and are open to the rotor space 43 and communicate via a rotary control valve 17 and a one way non-return air outlet valve 49 with the air inlet of the air receiver.

Between each air outlet port 16 and its closest radial sealing wall the peripheral wall member 46 is equipped with an atmospheric air induction port which will be described later in detail.

For the clockwise rotation of the rotor, valve 17a is set and remains at its open position thereby communicating port 16a with the air inlet of the air receiver, while valve 17b is set and remains at its closed position blocking any from passing gas from port 16b, and vice-versa for the counter-clockwise rotation of the rotor. The same process is repeated for the rotary control valve fitted to each atmospheric air induction port.

The fuel injector(s) 13 are connected to the fuel supply line, and timing and duration of the fuel injection is conveniently controlled by a suitable fuel timing valve (not shown) which is activated by the camshaft, the fuel being supplied to the timing valve under suitable pressure by means of a fuel pump and a fuel pressure regulating valve.

The cycle of operation of the engine will now be described for the clockwise rotation of the rotor, with reference to FIGS. 1 to 4. Referring to FIG. 1, when the rotor is at the firing position with the top edge of the leading radial face 3a of the rotary piston coinciding with zero degrees of the scale marked around the casing, which is equivalent to top dead center in a reciprocating piston engine, the injected fuel in the combustion chamber 47 ignites as it mixes with the hot compressed air which has been previously supplied to the chamber 47 and combustion takes place.

The injected fuel is symbolized by the dotted lines in FIG. 1. Once combustion occurs, the pressure of the gasses in chamber 47 will rise sharply and will apply a net resultant force which acts vertically on the surface of the trailing reaction radial face 3c of the rotary piston and thus, apply a direct torque on the rotor 2 and its driveshaft 1 which will force the rotor to turn in a clockwise direction of rotation.

Figure 2:
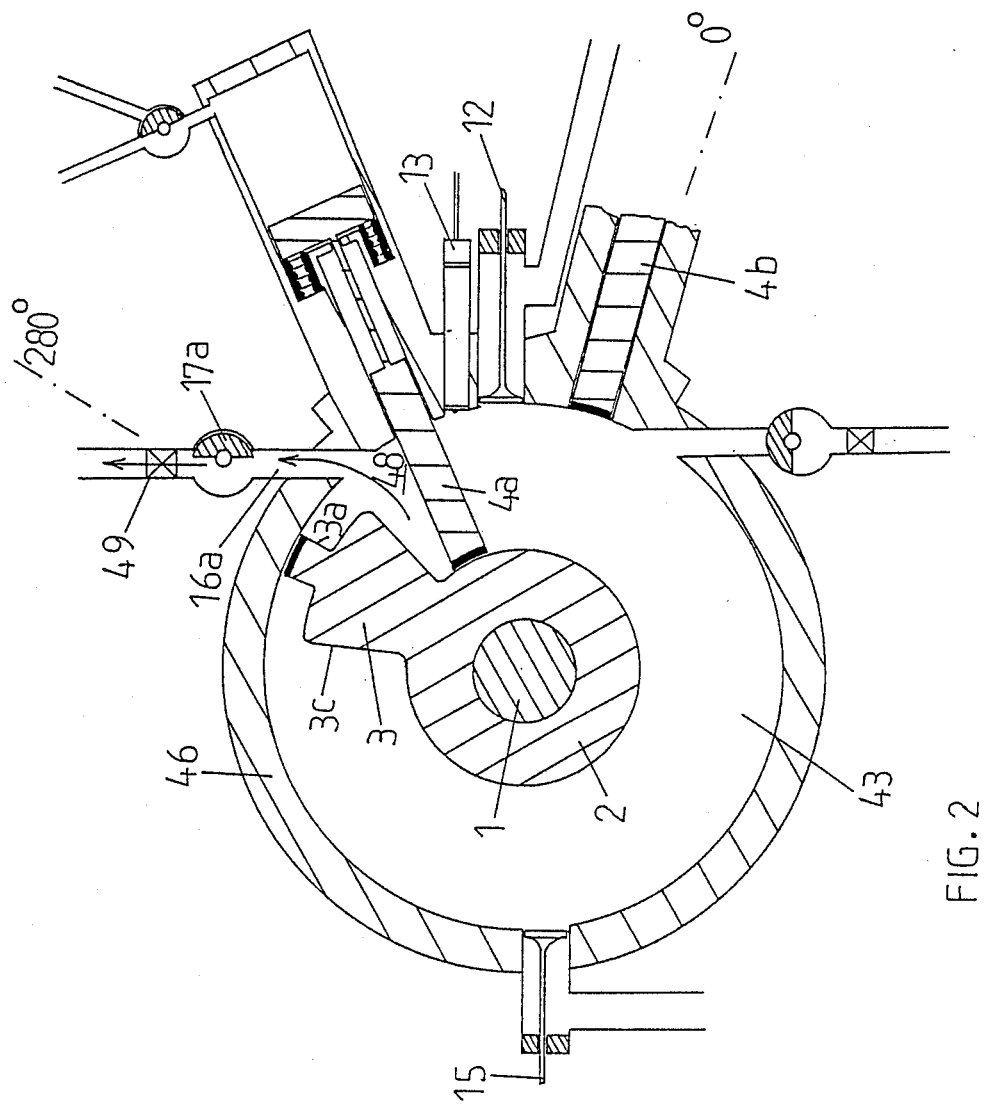
FIGS. 2 to 4 are views similar to FIG. 1 illustrating successive stages in the working cycle of the engine for the clockwise rotation of the rotor.

As the combustion gasses expand against the rotary piston 3 the volume of the air compression chamber 48 decreases continuously with the rotation of the rotor, and the rotary piston compresses the air in chamber 48, see FIG. 2. The compressed air is delivered to the inlet of the air receiver via the operational air outlet port 16a. The flow of the compressed air is symbolized by the arrows in FIG. 2. The compression process takes place over the whole stroke which lasts throughout 290 degrees of rotation, and at the end of the stroke there is highly compressed air trapped in chamber 48 between the radial leading face 3a of the rotary piston and the radial back face of the activated radial sealing wall 4a.

Figure 3:
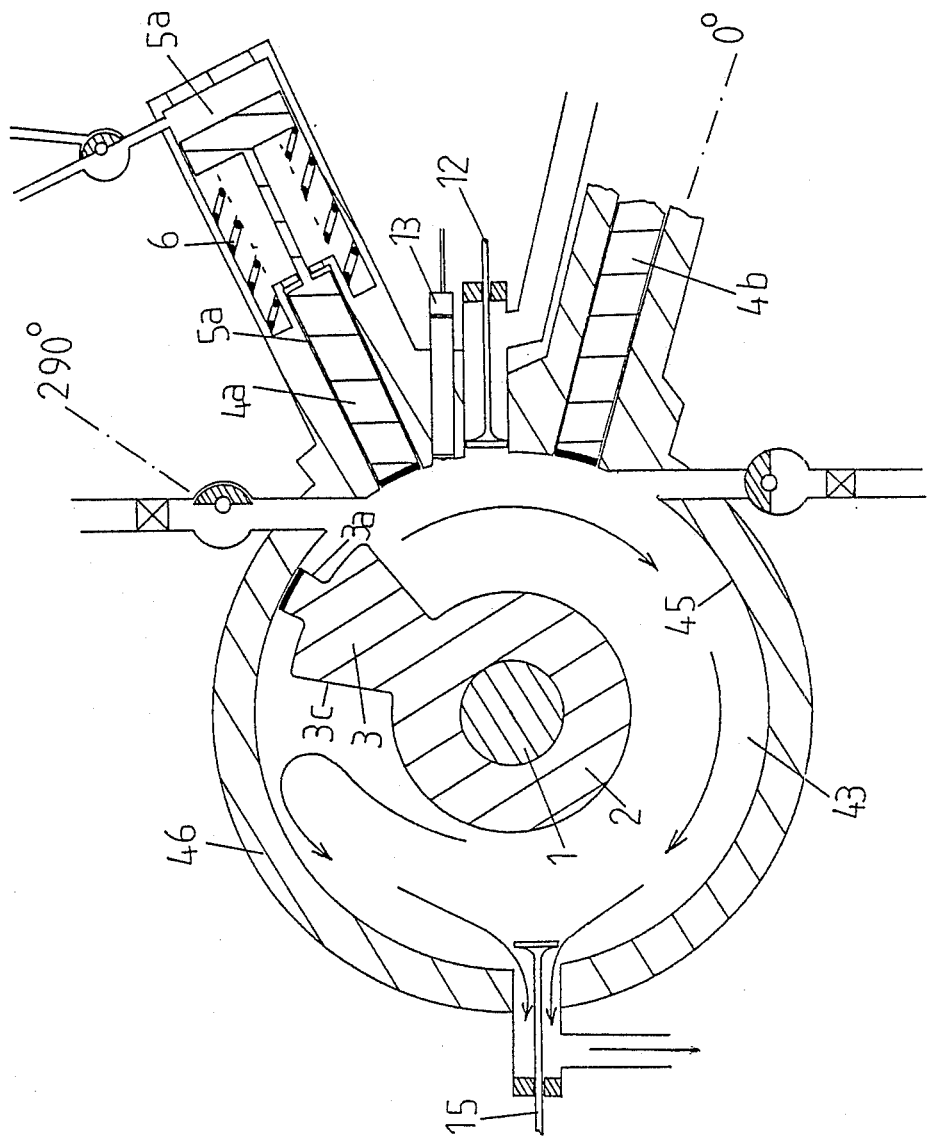

After 290 degrees of rotation, see FIG. 3, the exhaust gas timing valve 15 is hydraulically activated open, and simultaneously the camshaft allows the piston in the hydraulic cylinder which compresses the fluid supplied to the cylinder 5a to move from its top dead center position to its bottom dead center position.

Hence, the hydraulic pressure in cylinder 5a falls and the operational radial sealing wall 4a is biased outwards of the rotor center under the action of its spring 6 to the retracted position where its radially inner face lies flush with the inner periphery 45 of the peripheral wall member 46 of the stator casing. As the operational radial sealing wall 4a is activated to its fully retracted position, the compressed air previously trapped in the air compression chamber between it and the radial leading face 3a of the rotary piston is released and sweeps the rotor space 43 to scavenge it from the exhaust gasses which leaves the rotor space via the open exhaust gas timing valve 15. Hence, after 290 degrees of rotation the exhaust and scavenging phases begin. The flow of the scavenge air is symbolized by the arrows shown in FIG. 3.

The rotor continues to rotate under the momentum of the engine flywheel and the engine timing may be suitably adjusted to end the exhaust phase by activating valve 15 to close at any chosen point during the interval from the instant the rotor has rotated throughout 310 up to 340 degrees of rotation. However, in practice it is preferable to adjust the duration of the exhaust phase accordingly so that the exhaust gas timing valve 15 is activated to close about ten degrees before all of the scavenge air has left the rotor space.

Figure 4:
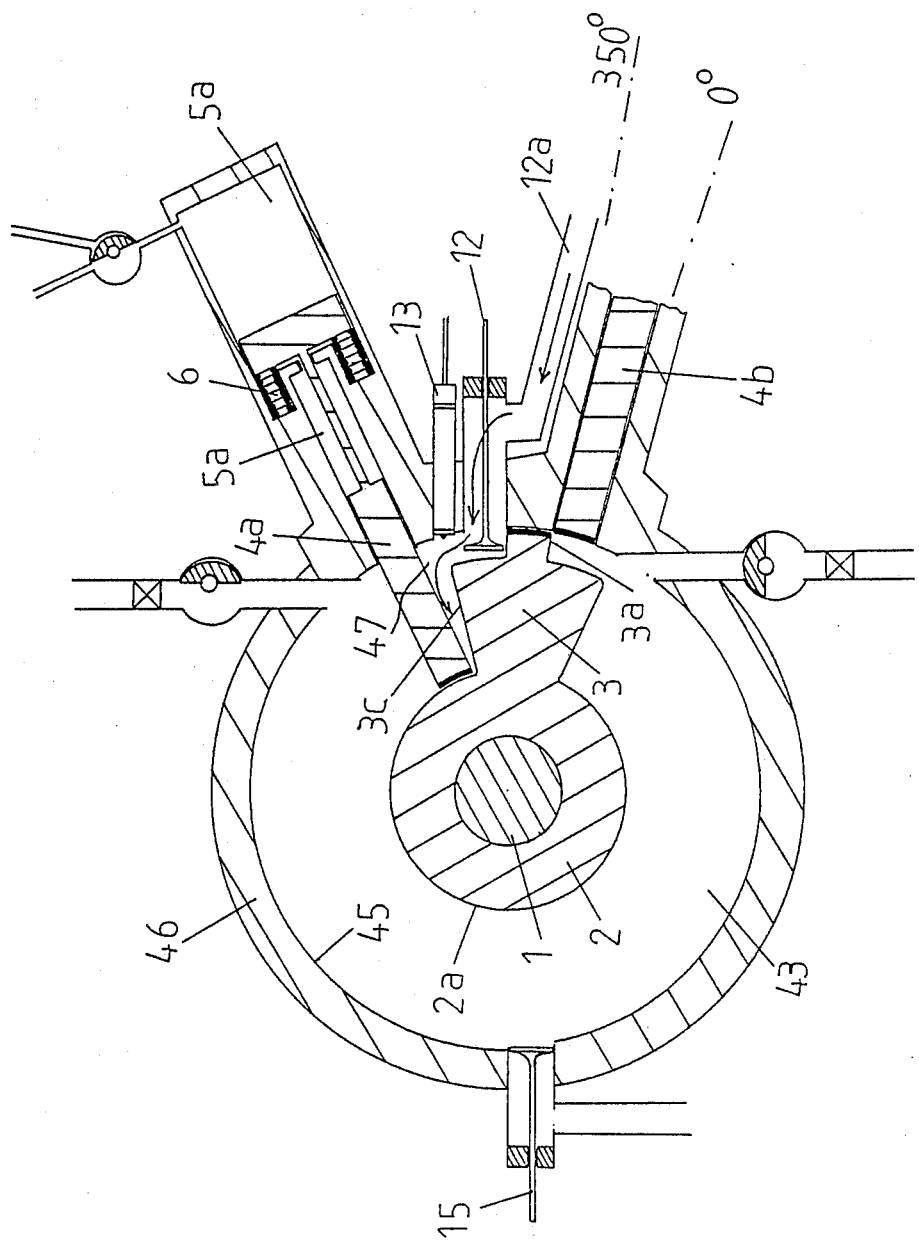

After the rotor has rotated throughout 350 degrees, see FIG. 4, the piston in the hydraulic cylinder which corresponds to the cylinder 5a which houses the operational radial sealing wall 4a is activated by the camshaft back to its top dead centre position, and pressurized hydraulic fluid enters cylinder 5a and activates the radial sealing wall 4a to move inwards towards the rotor center at the inserted position where its radially inner face is in contact with the peripheral surface 2a of the rotor hub. Simultaneously, the charge air inlet timing valve 12 is hydraulically activated to open by the camshaft, and compressed air leaves the outlet of the air receiver via duct 12a and enters the combustion chamber 47, through valve 12, along the direction indicated by arrows shown in FIG. 4, to build up the pressure of the air in chamber 47 to that required for the fuel ignition.

The engine timing may be adjusted so that the valve 12 is activated closed at any point during the interval from the instant the rotor has rotated throughout 355 degrees up to 359 degrees, depending on the ignition delay, and simultaneously the fuel injection begins.

Figure 5:
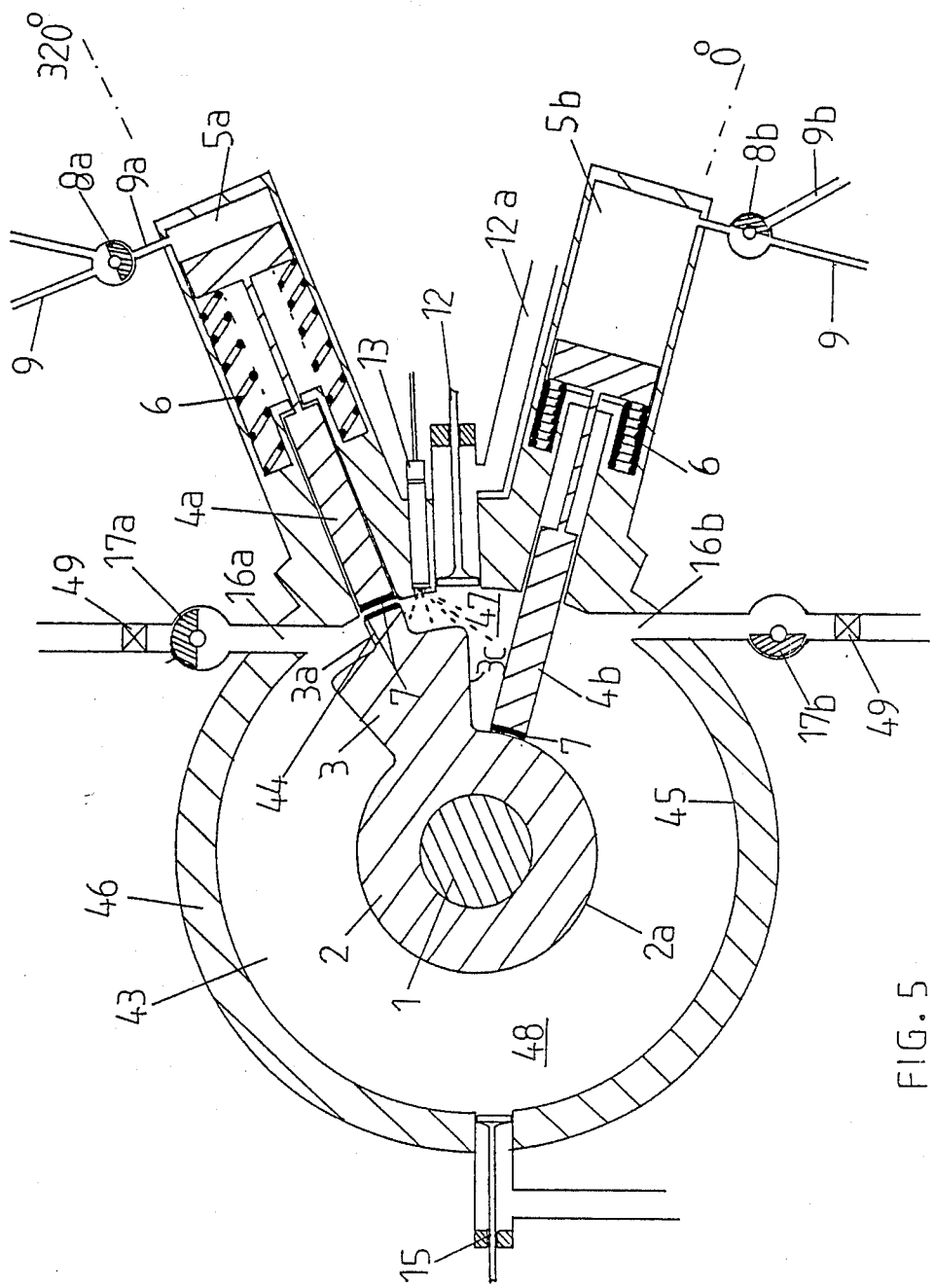
FIGS. 5 to 8 are views similar to FIG. 1 illustrating successive stages in the working cycle of the engine for the counter-clockwise rotation of the rotor.
Figure 6:
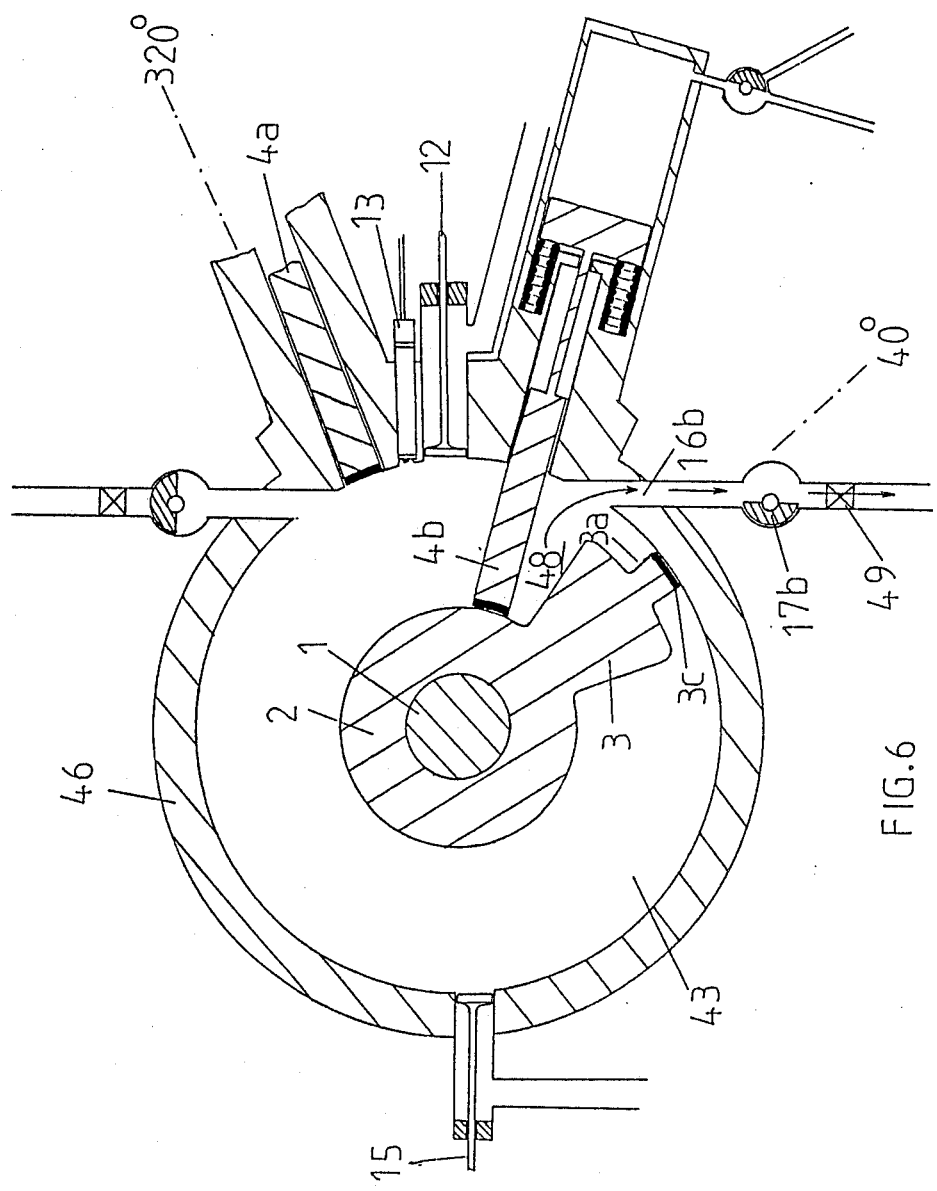
Figure 7:
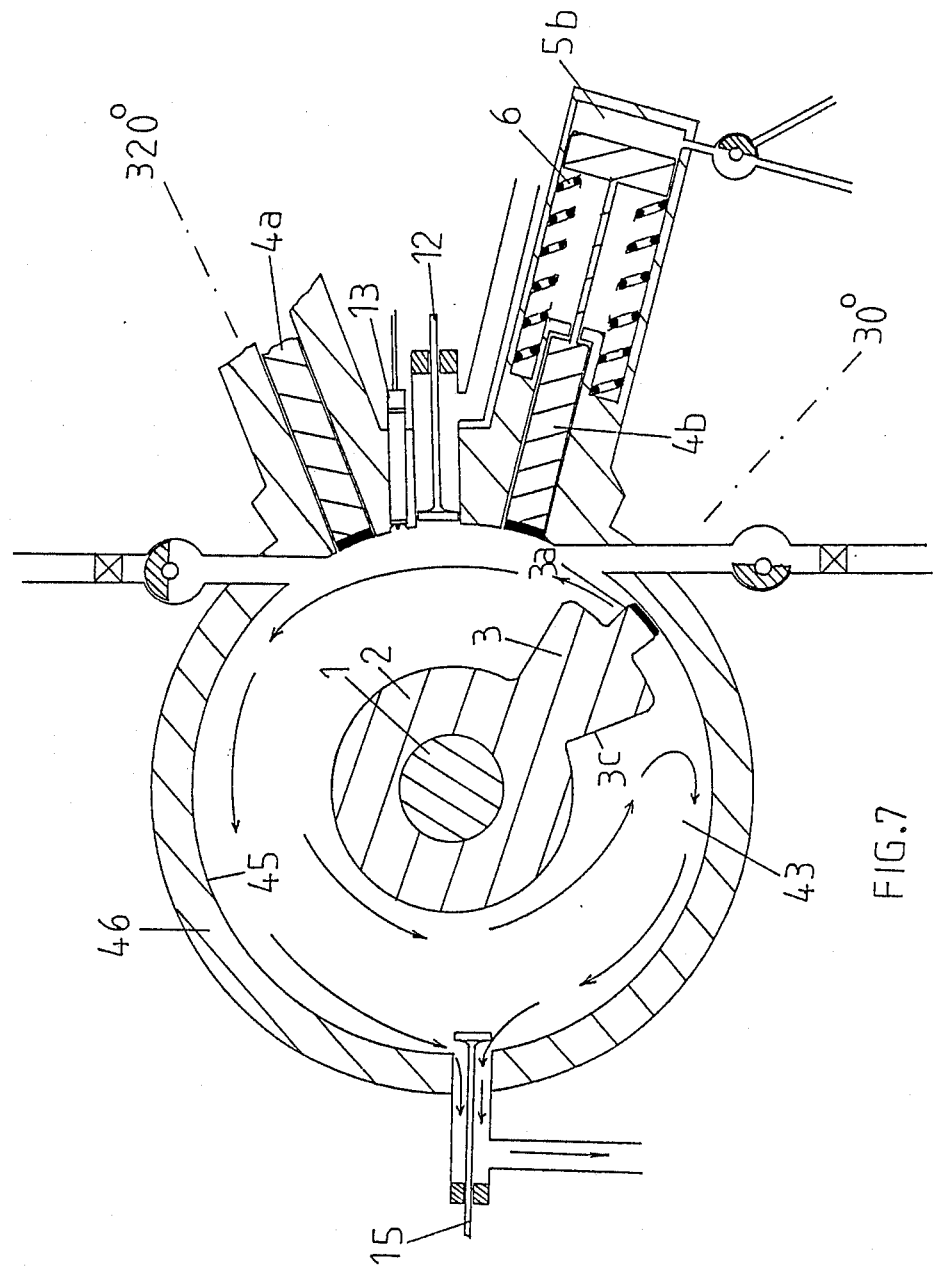
Figure 8:
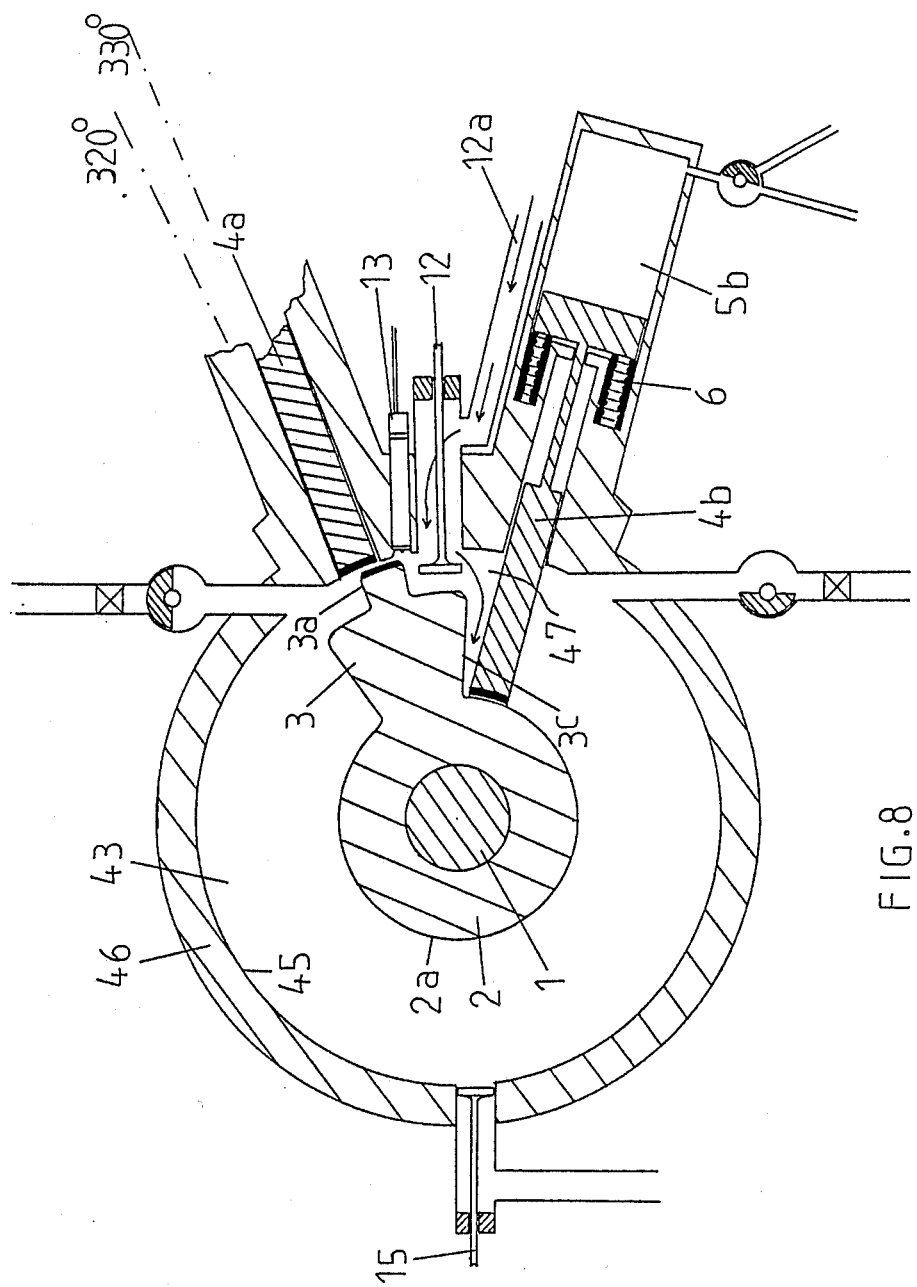

When the rotor has performed one complete revolution after having rotated throughout 360 degrees, see FIG. 1, ignition of the fuel/air mixture occurs in chamber 47, combustion takes place and the above described 360 degree cycle of operation is repeated. The fuel injection may be timed to last throughout about 10 to 20 degrees of rotation. In order to reverse the rotation, it is necessary to shift the engine cycle by 40 degrees, which means that ignition will occur at 320 degrees instead of zero degrees, see FIG. 5. To achieve reversal of the rotation from clockwise to counter-clockwise, the camshaft is rotated through 40 degrees in the counter-clockwise direction by means of the aforementioned reversing flap mechanism.

In addition, the rotary control valve 17a will be activated from its open position and set to its closed position, while valve 17b will be activated from its closed position and set to its open position thus, rendering port 16b operational. The same will apply for the rotary control valves 8a and 8b, whereby valve 8a will be activated from its open position and set to its closed position while valve 8b will be activated from its closed position and set to its open position. Hence, radial sealing wall 4b will become operational while radial sealing wall 4a will be rendered inoperative at the retracted position where its radially inner face lies flush with the inner periphery 45 of the stator casing. The same process is also repeated for the rotary control valves of the two atmospheric air induction ports.

A suitable control mechanism may be fitted on the engine so that evey time the rotation is reversed, all the above-described functions are performed simultaneously at the push of a button.

The cycle of operation for the clockwise rotation of the rotor is identical to the cycle for the clockwise rotation having a phase difference of 40 degrees, see FIGS. 5 to 8. FIG. 11 is a table illustrating the engine cycle of operation for both the clockwise and counter-clockwise rotation of the rotor.

Figure 9:
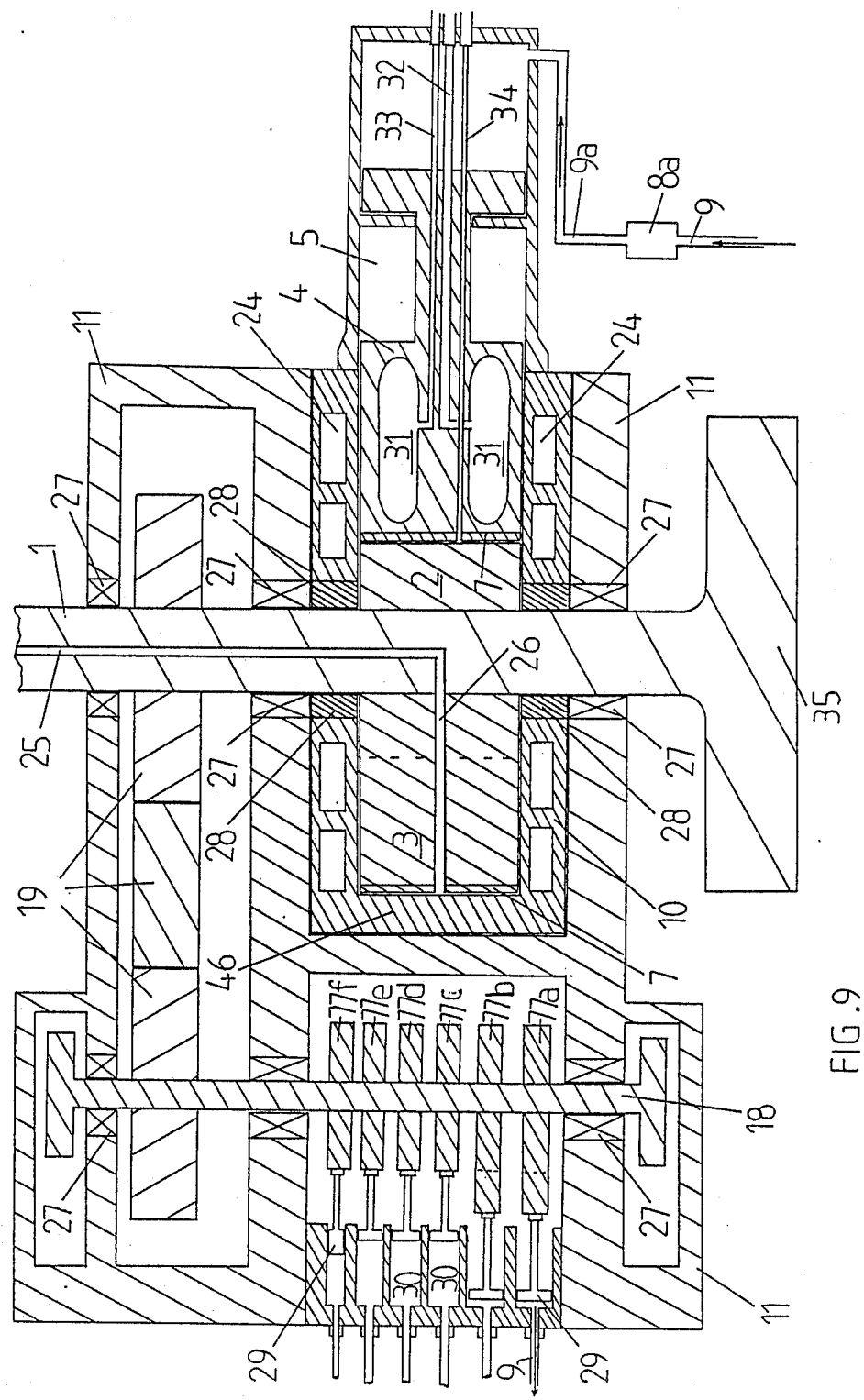
FIG. 9 is a longitudinal sectional view of the engine taken along a horizontally inclined plane which passes through the center line of the activated radial sealing wall at the position of the rotor where its rotary piston is diametrically opposite the activated radial sealing wall.

FIG. 9 is a longitudinal section of the engine which has a driveshaft 1 mounted in bearings 27 which are supported in a composite engine fixed structure 11. At one of its ends, the shaft 1 carries a flywheel 35 while its other end is attached to the drive unit (not shown). Intermediate the ends of shaft 1 the engine carries a gear 19, which via further gears 19 drives the camshaft 18, said camshaft mounted in bearings 27 which are supported in the composite engine fixed structure 11.

The camshaft carries six cams 77, said cams hydraulically activating the two radial sealing walls, the exhaust and charge air inlet timing valves, and the fuel pump plunger and fuel timing valve. The valves and radial sealing walls are hydraulically activated by pistons 29 which are mounted in cylinders 30 which contain the hydraulic fluid. Between the bearings 27, and secured on the driveshaft 1, is a rotor 2 mounted on the shaft 1 for rotation in its housing 10. The rotor housing 10 has cooling passages 24 provided in its opposed sidwalls for facilitating cooling water circulation and also carries cylindrical gaskets 28 which are fitted in the cylindrical shaft opening of each sidewall on which shaft 1 is supported. The peripheral part 46 of the casing is equipped amongst other components with two reciprocating radial sealing walls 4 each mounted in a cylinder 5.

Hydraulic fluid may be supplied to each cylinder 5 via the inlet duct 9 and rotary control valve 8 from its corresponding hydraulic cylinder 30. Each radial sealing wall 4 may be provided with cooling passages 31 through which oil coolant may flow to cool it. The oil coolant may enter each radial sealing wall from a telescopic pipe 32, circulate in passages 31 and leave via the return telescopic pipe 33. The radially inner face of each radial sealing wall and the radially outer end face of the rotary piston are each fitted with suitable seals 7 for peripheral gas sealing.

Lubrication of the rotor housing peripheral and lateral wall surfaces is achieved by means of a pump in conjunction with a timing device, not shown, which supply oil to the central oil feed bore 25 which is drilled through the center of shaft 1 and extends axially along part of its length ending at the mouth of a radial bore 26 which extends through the rotary piston to of the radially outer end face of the rotary piston.

Alternatively, if the peripheral lubrication is carried out externally by means of oil injectors disposed around the cylindrical wall member 46 in conjunction with an oil pump, a timing device and an oil distributor, the pressurized oil which is supplied to the bore 25 may be used to force the seals 7 which are fitted along the radially outer end face of the rotary piston to always be in firm contact with the peripheral cylindrical inner surface 45 of the stator casing, and also to cool the rotor.

With this alternative arrangement an oil injector is fed intermittently with oil at the instant when the radially outer end face of the rotary piston is directly under the tip of the injector.

Lubrication of the peripheral surface of the rotor hub and the lateral side faces of the rotor is achieved by means of a pump in conjunction with a timing device which supply oil to the telescopic pipe 34 which passes through the activated radial sealing wall 4 and extends up to its radially inner face which is in contact with the peripheral surface of the rotor hub throughout a given part of the engine cycle of operation. The oil supplied for lubrication may be suitably adjusted to be recirculated or consumed within the engine.

Lateral sealing of the gasses is ensured by the incorporation of suitable seals fitted in grooves which are located along the lateral faces of the rotor and follows its profile, while peripheral gas sealing is ensured by the incorporation of suitable seals which are fitted along the radially inner face of each radial sealing wall as well as the radially outer end face of the rotary piston. These seals may be spring biased or forced by pressurized oil outwards of their supports to ensure that they firmly engage their respective contact surfaces and thus, they provide the engine with adequate gasketing against escape of the combustion gasses in any direction thereby rendering the latter gastight.

Figure 10:
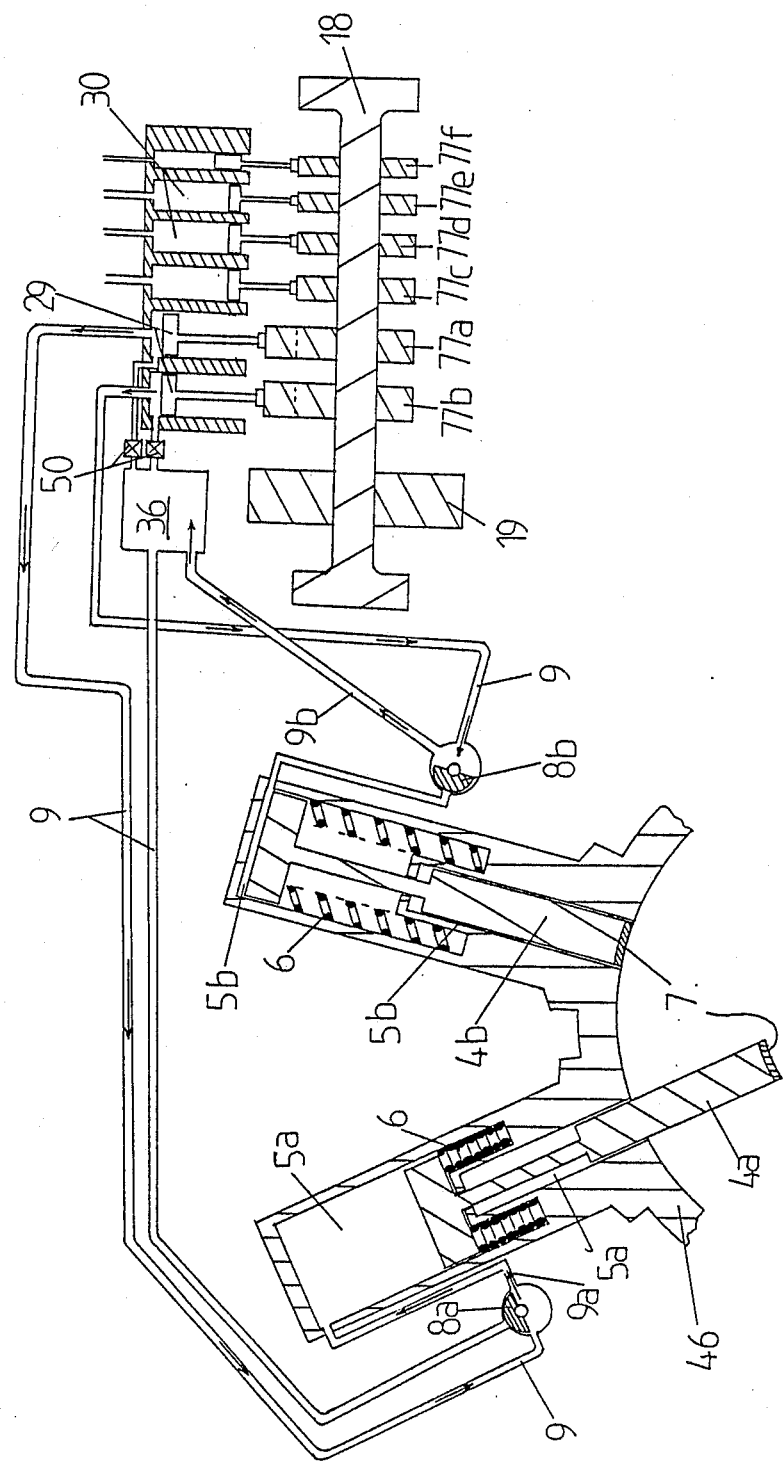
FIG. 10 is a schematic diagram illustrating the hydraulic operation of the radial sealing walls.

FIG. 10 is a schematic diagram illustrating the hydraulic operation of the radial sealing walls. Hydraulic fluid is supplied to the cylinders 5a and 5b which house the radial sealing walls 4a and 4b respectively. The pressurized fluid is supplied to the cylinders 5a, 5b by the pistons 29 which are mounted in hydraulic cylinders 30 which contain the hydraulic fluid, said pistons being activated to move from their bottom dead center position to the top dead center position and vice-versa, by cams 77a and 77b of the camshaft 18. Once the above pistons 29 are activated to their top dead centre position, pressurized hydraulic fluid reaches the rotary control valves 8a and 8b via the hydraulic supply lines 9.

For the clockwise rotation, the rotary control valve 8a is set at its open position. Hence, hydraulic fluid may enter the cylinder 5a and activate the radial sealing wall 4a to move inwards towards the rotor center against the action of its spring 6. The rotary control valve 8b is set at its closed position. Thence, the hydraulic fluid supplied to it will leave via the return line 9b to return to its sump 36, and vice-versa for the counter-clockwise rotation. The hydraulic fluid sump 36 communicates with the cylinders 30 via ducts each equipped with a one way non-return hydraulic valve 50 which allows fluid to flow from the sump 36 into the cylinders 30 only when the pistons 29 move from their respective top dead center positions to their bottom dead center positions.

Cams 77c and 77d activate the pistons 29 corresponding to the charge air inlet and exhaust timing valve respectively, while cams 77e and 77f activate the fuel pump plunger and the fuel timing valve respectively.

Figure 12:
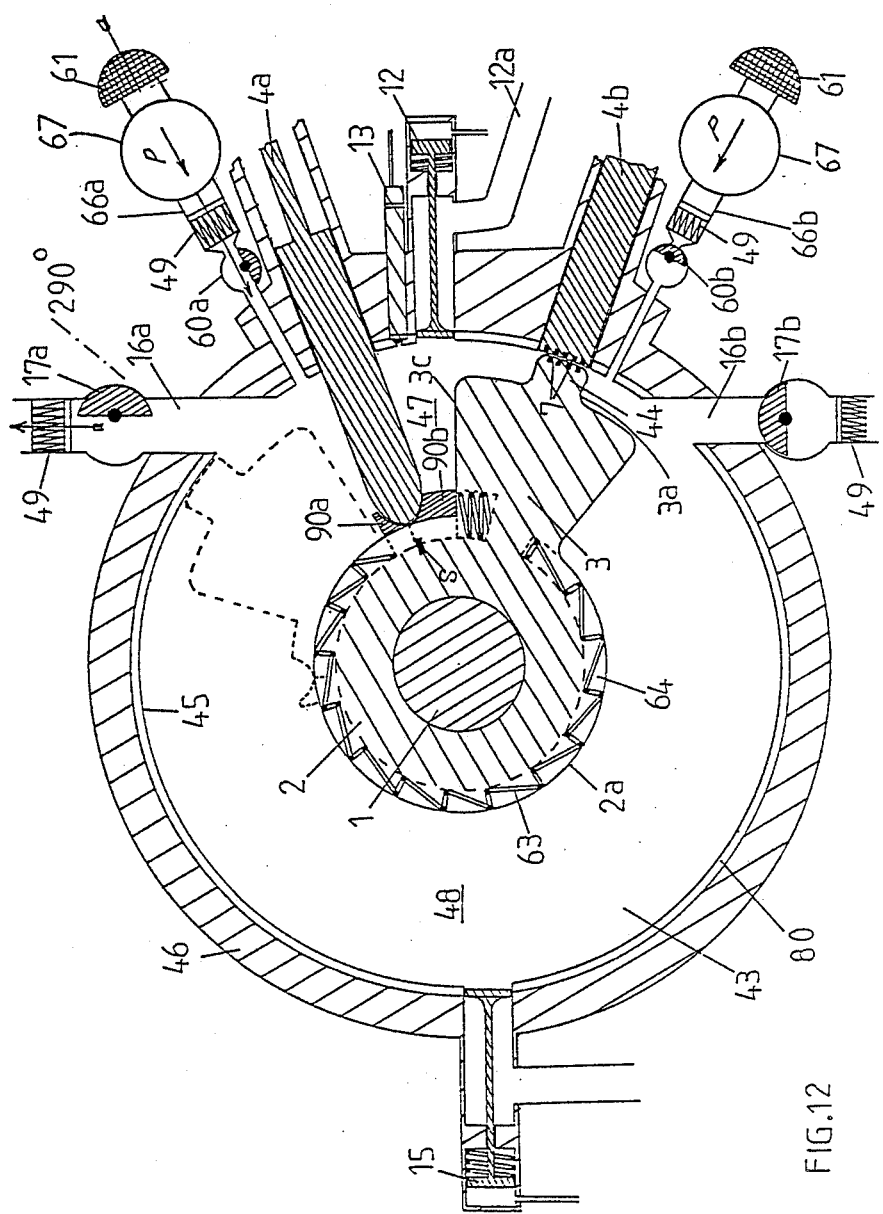
FIG. 12 is a cross-sectional view of the rotor similar to FIG. 1 but on a larger scale showing details of the air induction ports and an alternative sealing arrangement.

FIG. 12 is an enlarged cross-sectional view of the rotor taken along a vertical plane which passes through its center, and shows details of the casing and the various components affixed therearound. Once the exhaust and scavenging phases end and, before the pressure charging of the combustion chamber begins, the rotor space must be replenished with fresh atmospheric air. In order to allow for air induction, the rotor space communicates with the atmosphere via one of the air induction ports 66a or 66b, port 66a being set operational during the clockwise rotation while port 66b is set operational during the counter-clockwise rotation of the rotor. Each of the ports 66 is equipped with a rotary control valve 60, valve 60a being set at its open position during the clockwise rotation, while valve 60b is set at its open position during the counter-clockwise rotation of the rotor. In addition to the said rotary control valve each port 66 is also fitted with a one way non-return air inlet valve 49, which permits air to flow only from the atmosphere into the rotor space an air filter 61, and an air pump 67 to pump fresh air into rotor space 43.

After the end of the exhaust and the scavenging phases, when the scavenge air pressure has dropped, atmospheric air is pumped into the rotor space 43 via the operational air induction port 66 by air pump 67 and air induction takes place. The inlet/outlet directions of the atmospheric air are symbolized by the arrows shown in FIG. 12. The air pump 67 is connected to the end of ports 66 so that during the air induction phase there is plenty of air induced under pressure in the rotor space 43.

In order to simplify maintenance and ensure good sealing, the peripheral wall member 46 of the stator casing may be fitted with a cylindrical liner 80, and as the rotor rotates the radially outer end face of the rotary piston is always in contact with the inner peripheral surface 45 of the liner 80.

Peripheral sealing at the inner periphery of the stator is achieved by the incorporation of suitable seals 7 which are fitted in suitable grooves/supports disposed along the width of the radially outer end face of the rotary piston. The radially inner face of the radial sealing wall 4b which is operational during the counter-clockwise rotation of the rotor may be provided with similar seals 7.

Since the rotor in its actual operation will rotate in the forward or clockwise direction of rotation throughout most of its running, a good alternative sealing system should be provided between the peripheral surface 2a of the rotor hub and the radially inner face of the operational radial sealing wall 4a which is in contact with the surface 2a throughout a given part of the engine cycle of operation during the clockwise rotation, in order to prevent the combustion gasses in chamber 47 from escaping from the point of contact between the radial sealing wall 4a and the peripheral surface of the rotor hub.

There are many types of sealing arrangements which could be applicable to this engine, and a proposed sealing system is the following: The rotor hub surface 2a is provided with a sliding seal which is split into two parts 90a and 90b. Both such parts are secured in suitable grooves 64 which are disposed around the surface 2a, and when the rotor is at the firing position, zero degrees of the scale marked around the casing, parts 90a and 90b are forced into firm contact under the action of springs 63, see FIG. 12. When the combustion takes place, the pressure of the combustion gasses in chamber 47 will rise sharply and will force the rotor to rotate in the chosen clockwise direction as the gasses expand against the rotary piston 3. When the rotor begins to turn, seal part 90a remains in firm contact with the radially inner face of the activated radial sealing wall 4a and slides along the surface 2a, while seal part 90b follows the rotary piston.

In order to prevent seal 90b from sliding in the counter-clockwise direction out of its position, a suitable stopper s is fitted in groove 64. Hence, as the rotor rotates seal 90b moves away from its counterpart seal 90a until the rotor completes 290 degrees of rotation, and at this point the operational radial sealing wall 4a is forced by its spring outwards of the rotor center to its fully retracted position, and as it lifts seal 90a is forced by spring 63 to slide in the clockwise direction along the surface 2a until it comes into firm contact with seal 90b, and this is shown by the dotted lines in FIG. 12. With this arrangement, since sliding seal 90a is kept in firm contact with the radially inner face of the activated radial sealing wall 4a throughout the whole stroke, good peripheral sealing is ensured at the inner rotor periphery In order to ensure equally good lateral sealing, the lateral faces of the rotor may be fitted with suitable grooves which follow its profile and house lateral strip or roller seals. These seals may be spring or pressure biased outwards of their supports so that they engage firmly with their respective contact surfaces.

Figure 13:
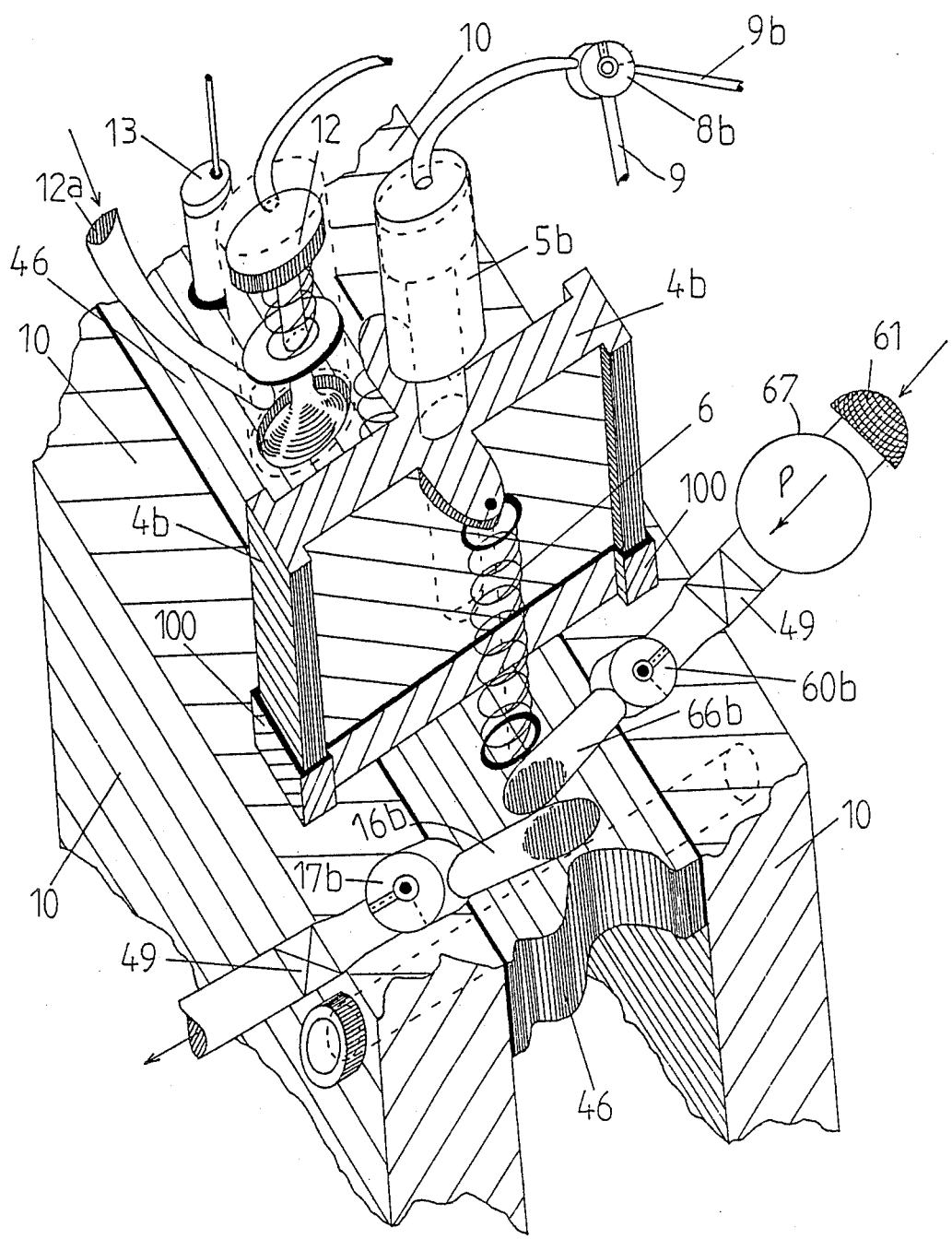
FIG. 13 is an enlarged pictorial view of part of the peripheral wall member of the stator casing showing the arrangement of a radial sealing wall and the various valves and ports located on either side of it.

Both of the abovementioned radial sealing walls extend laterally beyond the width of the peripheral wall member 46 of the stator casing, see FIG. 13, and are firmly supported in suitable radial guides 100 which are provided along part of the inner lateral surface of both opposed sidewalls. The inner surfaces of the guides 100 may be coated with suitable sealing material.

With this arrangement, the operational radial sealing wall is always kept firmly in position when reciprocating radially in a perfect straight line along the guides 100. The direction of the flow of air in and out of the rotor space is symbolized by the arrows shown in FIG.

13. The reciprocating radial sealing walls may be alternatively modified to reciprocate sideways instead of radially, from one sidewall through a guide in the opposed sidewall. This suggested alternative arrangement could be beneficial in cases where the inner rotor diameter is chosen to be appreciably smaller than its outer diameter, and the radial distance of reciprocation would by far exceed the suggested lateral distance of reciprocation. In order to improve the efficiency of the above described engine one or more turbochargers may be connected between the exhaust manifold and the air inlet of the air receiver.

Figure 14:
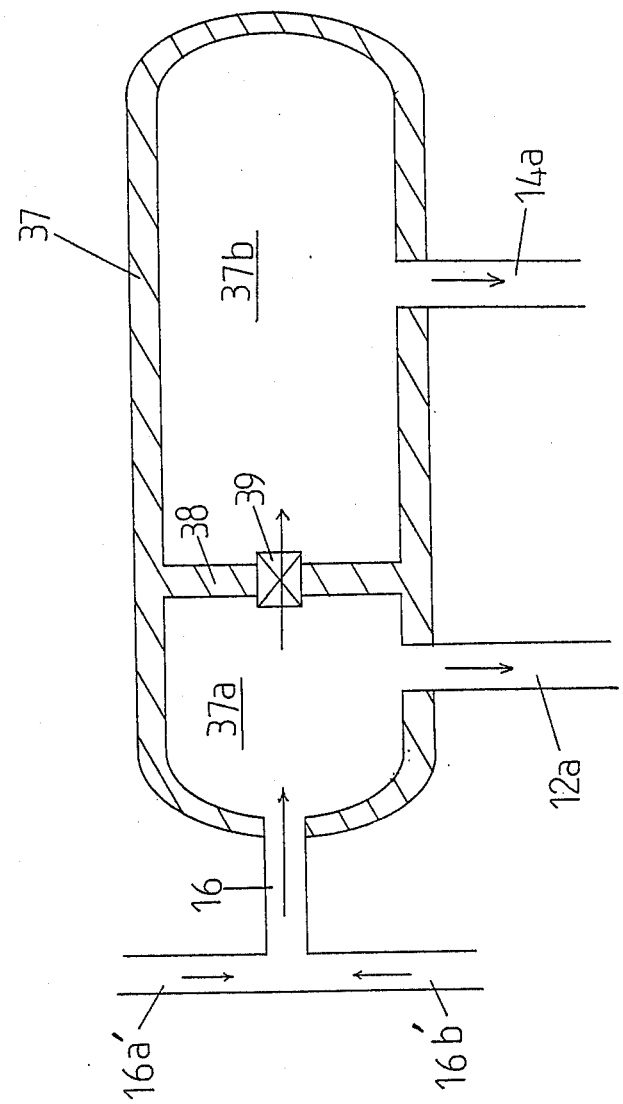
FIG. 14 is a cross-sectional view of the air receiver used when a scavenge air timing valve is added to the engine and is taken along a vertical plane which passes through the center line of the air receiver.
Figure 15:
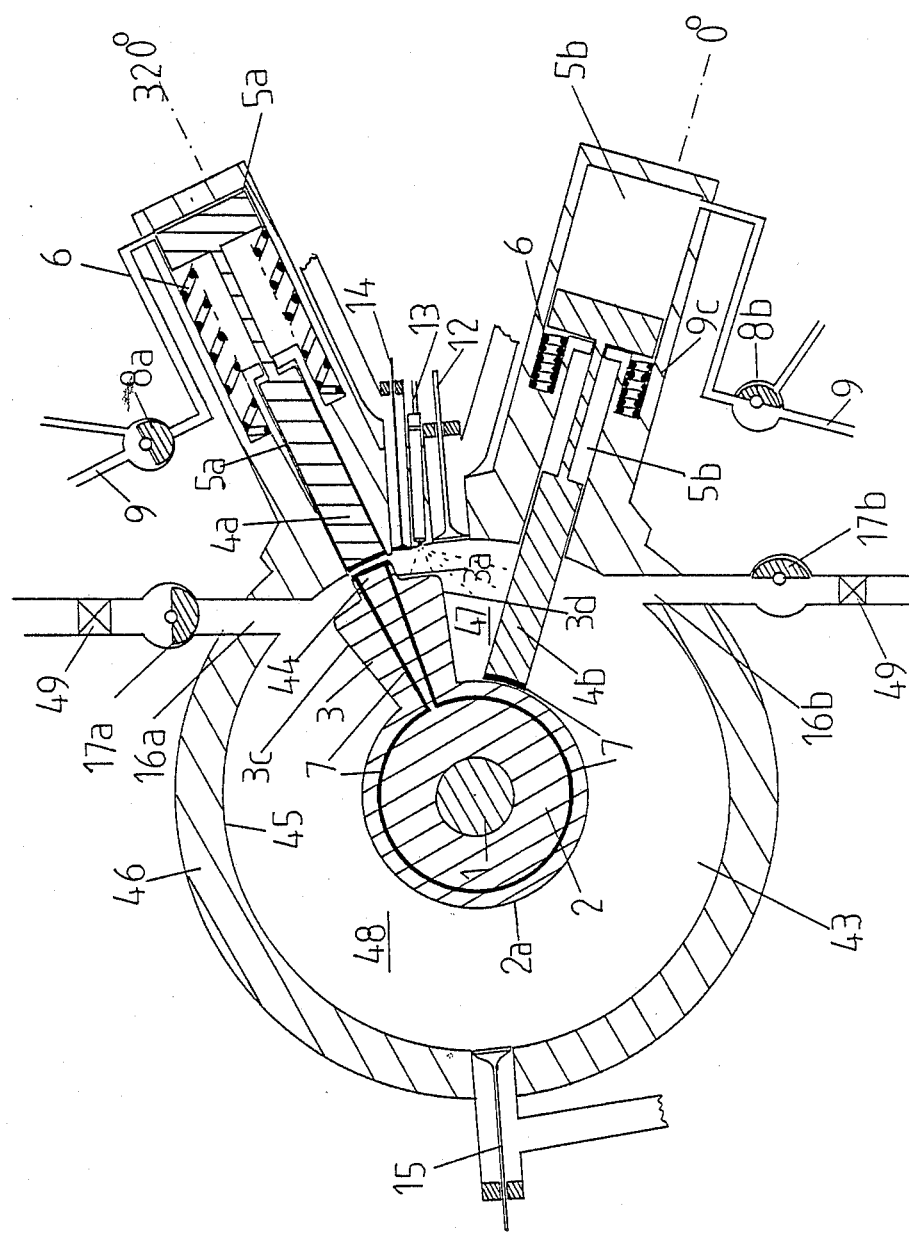
FIG. 15 is a cross-sectional view of the rotor taken along the vertical plane adjacent to a lateral face of the rotor.

In addition, for improving the scavenging process, see FIG. 15, a scavenge air inlet timing valve 14 may be fitted to the peripheral wall member of the stator casing disposed in the sector which lies between the planes of the two radial sealing walls, said valve positioned radially about and open to the rotor space, and being hydraulically activated to be opened or closed by the engine camshaft. With the addition of this valve, the air receiver 37 is divided in two portions, see FIG. 14, the charging and the scavenging portion respectively, by a partition 38 which is fitted with a pressure sensitive valve 39 which allows only such air as is in excess of the charging requirement of the combustion chamber to pass from the charging to the scavenging portion.

Compressed air is supplied to the air inlet 16 of the air receiver which communicates with the two abovementioned air outlet ports 16a, 16b via ducts 16a', 16b' respectively. The charging portion communicates with the charge air inlet timing valve 12 via duct 12a, while the scavenging portion communicating with the scavenge air inlet timing valve 14 via duct 14a.

Also as previously mentioned, the peripheral wall member 46 of the stator casing may be fitted with more than one fuel injectors for better distribution of the injected fuel charge in the combustion chamber, or alternative fuel injection means may be used e.g. carburetors. The aforementioned engine has the following advantages:

(i) The rotor rotates concentrically and the engine is reversible. Therefore, it disperses with the crankshaft, crossheads, piston and connecting rods or a reversing gearbox which are commonly used in conventional two and/or four stroke reciprocating piston engines, and it also dispenses with eccentric gears commonly used in "Wankel" type rotary engines. Furthermore, since the stator casing is of a uniform cylindrical shape, the angle of contact between the seals fitted along the radially outer end face of the rotary piston and the inner peripheral surface of the stator housing, as well as the angle of contact between the seals fitted along the radially inner face of the operational radial sealing wall and the peripheral surface of the rotor hub are constant throughout the rotation of the rotor and thus, restrict seal wear to a minimum.

(ii) The engine operates on the one-stroke principle. Therefore, its geometry and 360 degree cycle of operation allow the combustion gasses to expand against the rotary piston in the rotor space throughout up to 294 degrees of rotation, i.e. in excess of 80% of the engine cycle of operation and thus, minimize the exhaust gas losses thereby resulting in an outstandingly high engine efficiency.

(iii) The number of engine moving parts is small and since there is no conversion of reciprocating motion into rotational motion the rotor can be easily balanced, thus resulting in easy maintenance, minimum vibrations and good reliability. Furthermore, the engine occupies appreciably less space than a conventional reciprocating piston engine developing the same power, especially in the vertical direction.

(iv) With the incorporation of a suitably designed charged air inlet timing valve the highly compressed charge air is injected under turbulence into the combustion chamber. Hence, a good air injection system is achieved which in turn results in a high combustion efficiency.

(v) The engine benefits the capability of achieving gas expansion and air compression simultaneously within the same rotor space and is therefore distinguished as a reversible one-stroke rotary internal combustion engine. The engine is also capable of achieving high compression ratios, thus benefiting from the capability of operating on a variety of fuels and in particular on cheap fuels such as H.V.F. and slurries, e.g. of coal.

(vi) with the incorporation of the air receiver in the engine design, the air pressure charging of the combustion chamber is achieved under constant pressure, and this will contribute positively towards the engine efficiency.

(vii) Since the length/duration of the stroke of the above engine is more than double the rotational length of the power stroke of a conventional reciprocating piston and/or rotary engine capable of burning the same amount of fuel per second, it follows that the combustion gasses are kept much longer in the rotor space performing useful work on the rotor and thus, since the stroke may be timed to last in excess of 80% of the engine cycle of operation, it follows that the efficiency of this engine will be outstandingly high and in addition, the combustion gasses will exhaust at a significantly lower temperature than the exhaust temperature of conventional reciprocating piston and/or rotary engines, thus minimizing the well known problems associated with exhaust valve wear.

(viii) Two or more identical rotors may be mounted on the same driveshaft for rotation in identical housings and having identical cycles of operation with any chosen phase difference between them.

Figure 16:
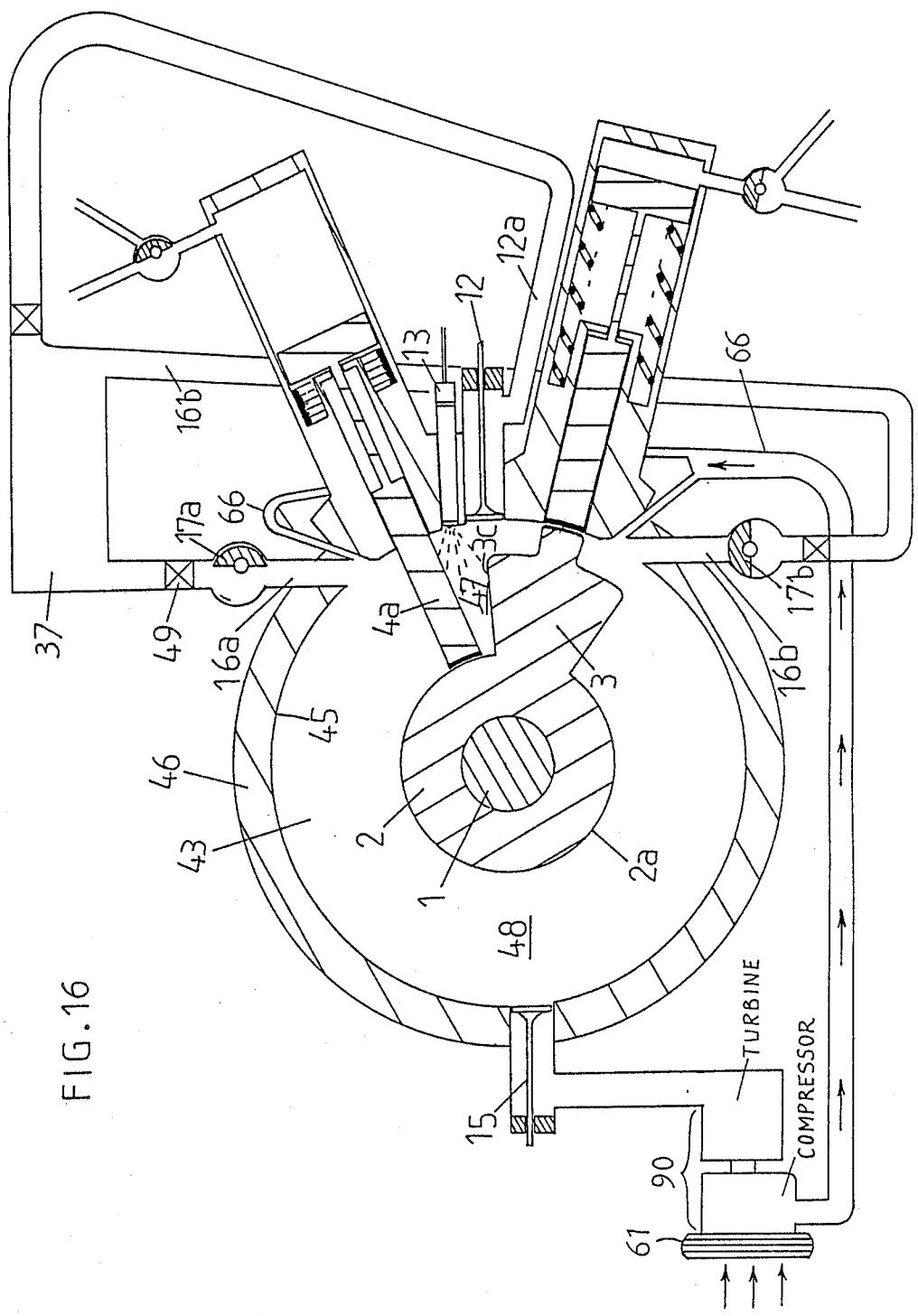
FIG. 16 is a cross-sectional view of the rotor of the engine according to the present invention but illustrating a modified embodiment in which a turbo device is used to induce fresh air into the rotor space.

FIG. 16 illustrates a modified version of the present invention in which the air pump 67 shown in FIG. 12 is replaced with a turbo device 90. In the Figure, the reference numerals used in FIG. 12 and other previously discussed Figures refer to like elements.

The turbo device 90 is comprised of a turbine and a compressor. The turbine is driven by exhaust gases when the exhaust gas timing valve 15 is opened. The turbine in turn drives the compressor to induce air into fresh air inlet ports 66 through air filter 61.

I claim:

1. A reversible rotary internal combustion engine comprising:

a stator comprising a cylindrical chamber;

a drive shaft extending through said chamber;

a rotor comprising a cylindrical hub fixed to said drive shaft and a rotor arm extending radially from said hub to the inner peripheral surface of said chamber;

first and second radially movable wall members mounted to said stator at respective locations that are spaced radially from one another around said stator, each of said first and said second radially movable wall members being movable in respective directions that extend substantially between a retracted position at which faces of the wall members lying radially innermost with respect to said cylindrical chamber are respectively flush with the inner peripheral surface of said chamber and an inserted position at which said faces contact the outer peripheral surface of the hub of said rotor;

an air receiving means, and respective compressed air outlet ports, one of which is associated with one of said wall members and the other of which is associated with the other of said wall members, said air outlet ports extending between said cylindrical chamber and said air receiver means;

selector means for moving said first wall member to the inserted position and said second wall member to the retracted position when said rotor is to be rotated in a first rotational direction within said cylindrical chamber during operation, and for moving said first wall member to the retracted position and said second wall member to the inserted position when the output of the combustion engine is to be reversed and said rotor is to be rotated in a second rotational direction within said cylindrical chamber that is opposite to said first rotational direction, a combustion chamber being defined within said cylindrical chamber between one side of the one of said wall members that is at the inserted position and said rotor, and an air compression chamber being defined between the other side of the one of said wall members that is at the inserted position and said rotor;

fresh air introduction port means open to said air compression chamber and comprising an air pump for pumping fresh air into said cylindrical chamber;

opening and closing means for opening the one of said compressed air outlet ports that is associated with the one of said wall members that is at the inserted position to place the cylindrical chamber in communication with said air receiver means and for closing the other of said compressed air outlet ports;

inlet means operatively connected between said air receiver means and the combustion chamber defined within said cylindrical chamber for introducing air from said air receiver means into said combustion chamber and for introducing fuel into said combustion chamber with the air introduced therein, such that the air and the fuel in said combustion chamber when ignited generate combustion gases which expand to force said rotor to rotate in said first rotational direction if said first wall member is at the inserted position and to force said rotor to rotate in said second rotational direction if said second wall member is at the inserted position thereby compressing the fresh air pumped into the compression chamber through said fresh air introduction port means, most of which passes through the open one of said compressed air outlet ports to said air receiver means;

exhaust means communicating with said cylindrical chamber; and timing means synchronized with the rotation of said rotor for retracting the one of said wall members that is at the inserted position from the inserted position to the retracted position after the rotor has rotated a predetermined amount within said stator that corresponds to at least 80% of the engine cycle such that the fresh air pumped into the compression chamber and compressed by the rotor that remains in the cylindrical chamber expands through said cylindrical chamber to scavenge the expanded combustion gases within the cylindrical chamber from said cylindrical chamber through said exhaust means, and said timing means for reinserting the same said one of said wall members after it has been retracted to the retracted position back to the inserted position after said rotor arm of said rotor has rotated past the space within said cylindrical chamber that is occupied by the same said one of said wall members when at the inserted position.

2. A reversible rotary engine as claimed in claim 1, wherein each of said wall members comprises a piston slidably mounted within a cylinder, and a spring means for biasing the piston radially outwards from the stator.

3. A reversible rotary engine as claimed in claim 1 or claim 2,
wherein said timing means comprises a camshaft that is coupled to said drive shaft, and a series of valves in operative engagement with said camshaft,
said cam shaft rotated by said drive shaft to actuate said series of valves in a predetermined cycle for retracting and inserting the wall and for controlling both said air introduction means and said exhaust means to open and close in a predetermined manner.

4. A reversible rotary engine as claimed in claim 2,
wherein said inlet means comprises a charge air inlet valve and a fuel injector both of which are disposed on the stator at a location thereon which is between the first and second wall members,
and said exhaust means comprise an exhaust valve which is disposed at a location on said stator diametrically opposite from that of said inlet means.

5. A reversible rotary engine as claimed in claim 1, wherein said fresh air introduction port means includes a non-return inlet valve and a rotary control valve.

6. A reversible rotary engine as claimed in claim 1,
wherein the engine cycle is a 360° cycle and the timing means opens the exhaust means when the rotor has rotated through an angle of rotation of 290° after ignition and closes the exhaust means when the rotor has rotated through an angle of rotation that is between 310° and 340°.

7. A reversible rotary engine as claimed in claim 4, wherein said respective locations are spaced 40° radially from one another, and said rotary arm has first and second sides extending radially from the cylindrical hub that are spaced 40° apart.

8. A reversible rotary engine as claimed in claim 1, wherein the outermost radial face of said rotor arm is recessed for preventing hindrance of the rotation of said rotor caused otherwise by said inlet means.

9. A reversible rotary engine as claimed in claim 1, and further comprising at least one other rotor attached to said driveshaft in at least one other respective cylindrical chamber,
each rotor arm of said rotor and the at least one other rotor being angularly offset on said drive shaft with respect to one another thereby providing a phase displacement between the rotors.

10. A reversible rotary internal combustion engine as claimed in claim 1,
wherein said air pump is a turbo device, said turbo device including a turbine operatively connected to said exhaust means for being driven by exhaust gases passing from said cylindrical chamber, and a compressor operatively connected to said turbine for being driven thereby and to said first air introduction port means for pumping fresh air into said cylindrical chamber through said fresh air introduction port means when driven by said turbine.

* * * * *